United States Patent [19]

Higashi et al.

[11] Patent Number: 4,880,895

[45] Date of Patent: * Nov. 14, 1989

[54] POLYIMIDE FILM-FORMING POLYAMIDE ACID SOLUTION

[75] Inventors: Kazumi Higashi; Yuzuru Noda, both of Osaka, Japan

[73] Assignee: Nitto Electric Industrial Co., Ltd., Osaka, Japan

[*] Notice: The portion of the term of this patent subsequent to Oct. 17, 2006 has been disclaimed.

[21] Appl. No.: 32,643

[22] Filed: Mar. 31, 1987

[30] Foreign Application Priority Data

Mar. 31, 1986 [JP] Japan .................................. 61-76083

[51] Int. Cl.$^4$ ............................................... C08G 8/02
[52] U.S. Cl. ..................................... 528/173; 528/125; 528/126; 528/128; 528/172; 528/176; 528/188; 528/208; 528/229; 528/353
[58] Field of Search ............... 528/176, 188, 229, 353, 528/208, 125, 126, 128, 172, 173

[56] References Cited

U.S. PATENT DOCUMENTS 3,234,181  2/1966  Olivier ................................. 528/353
4,520,075  5/1985  Igarashi et al. ..................... 428/435

FOREIGN PATENT DOCUMENTS 0036330  9/1981  European Pat. Off. .
3526010  1/1986  Fed. Rep. of Germany .
2101149  1/1983  United Kingdom .

OTHER PUBLICATIONS

Synthesis and Characterization of Essentially Colorless Polyimide Films: Anne K. St. Clair et al.
Patent Abstracts of Japan, vol. 7, No. 268, (C-197)(1413), Nov. 30, 1983.
Patent Abstracts of Japan, vol. 10, No. 13, (C-323)(2070) Jan. 18, 1986.

Primary Examiner—John Kight
Assistant Examiner—M. L. Moore
Attorney, Agent, or Firm—Sughrue, Mion, Zinn, Macpeak & Seas

[57] ABSTRACT

A polyamide acid solution is disclosed, comprising a polyamide acid comprising as main components at least one recurring unit selected from the recurring units of the formulae (I) to (IV) and a recurring unit of formula (V), dissolved in an organic solvent comprising as a main component an amide type polar solvent having a boiling point of 170° C. or less. The solution is capable of forming a polyimide film which has colorless transparency free from coloration and strong adhesion to a substrate for liquid crystal cell enough to prevent penetration of water into interface between the substrate and film. The solution is particularly useful for forming a liquid crystal oriented film.

10 Claims, No Drawings

POLYIMIDE FILM-FORMING POLYAMIDE ACID SOLUTION

FIELD OF THE INVENTION

The present invention relates to a polyamide acid solution capable of forming a polyimide film having excellent colorless transparency and adhesion to a substrate, and more particularly to a polyamide acid solution for forming a liquid crystal oriented film.

BACKGROUND OF THE INVENTION

In liquid crystal display elements, such as liquid crystal cells which operate by the action of an electric field, a liquid crystal oriented film (insulating film) is formed so as to cover a surface of an electrode formed on a substrate, such as a glass plate, in order to prevent direct contact between the electrode and liquid crystals, which causes deterioration of the liquid crystals. The liquid crystal oriented film conventionally employed is an inclined deposited film of silicon oxide. However, the silicon oxide deposited film is not a good liquid crystal oriented film because it shows considerably different orientation characteristics depending on the type of liquid crystals used. Hence, it has been proposed to use a rubbed film of an organic high polymer as a liquid crystal oriented film. While many of the rubbed high polymer films have a disadvantage that the rubbing effect is reduced by heating for assembling a liquid crystal cell, polyimide films are free from such a disadvantage. Therefore, aromatic polyimide films having satisfactory orientation controllability are widely employed.

Since an aromatic polyimide is generally insoluble and infusible, it is usually coated on a substrate in the form of a polyamide acid, i.e., a precursor of a polyimide, dissolved in an organic polar solvent, such as N-methyl-2-pyrrolidone, and the precursor is then imidized by heating at high temperatures, accompanied by dehydrocyclization, to cure the same. The polyimide film for use as liquid crystal oriented film has also been formed in the same manner.

However, the thus formed polyimide films are colored brown due to the severe thermal history up to the film formation. Such coloration darkens the visual field to reduce contrast, thereby impairing functions of display elements. Thus, the polyimide films do not respond to the demand for high quality liquid crystal display elements. For example, polyimide films prepared from pyromellitic acid dianhydride and 4,4'-diaminodiphenylether as starting materials are fairly excellent in homogeneity of orientation and durability, but they do not satisfy requirements for high quality liquid crystal display elements due to their brown color which arises from high temperature heating at dehydrocyclization (imidation). In addition, aromatic polyimide films are generally inferior in adhesion to a substrate to cause penetration of water into the interface between the substrate and the polyimide film, resulting in decreasing reliability of the liquid crystal display elements.

Other than the above-described polyamide acid solution for forming liquid crystal oriented film, polyamide acid solutions used for production of substrates of solar cells, coating the surface of lenses, and the like have the requirements of adhesion to a substrate and transparency of a film formed, but satisfactory polyamide acid solutions are not yet obtained.

Thus, it is extremely difficult for the conventional prior art to form a colorless transparent polyimide film having excellent adhesion to a substrate, which is particularly useful as a liquid crystal oriented film, and the improvement thereof is strongly demanded

SUMMARY OF THE INVENTION

As a result of extensive studies on the cause of coloration of polyimide films, it has been found that the organic polar solvent such as N-methyl-2-pyrrolidone used for dissolving a polyamide acid, i.e., a polyimide precursor, has a high boiling point and remains in the coated film till the coated film is heated for dehydrocyclization of the polyamide acid and the organic polar solvent partly decomposes upon heating for dehydrocyclization of the polyamide acid to produce blackish brown decomposition products. As a result of further investigations, it has been also found that when 3,3',4,4'-diphenylsulfonetetracarboxylic acid dianhydride is used as an aromatic tetracarboxylic acid dianhydride which is the starting material of polyamide acid and combined with a specific aromatic diamino compound to prepare a polyamide acid, the resulting polyamide acid is soluble in low-boiling solvent, such as N,N-dimethylacetamide; and since the low-boiling solvents volatilize before they are decomposed in dehydrocyclizing the polyamide acid, any colored decomposition products as in the case of N-methyl-2-pyrrolidone are not produced, colorless and transparent polyimide films can be obtained. It has been further found that a combined use of a small amount of diaminosiloxane with the above-described specific aromatic diamino compound markedly improves adhesion of the resulting polyimide film to a substrate such as a glass plate. The present invention was completed based on these findings.

Accordingly, an object of the present invention is to provide a polyamide acid solution capable of forming a colorless transparent polyimide film showing excellent adhesion to a substrate, which is particularly suitable for use as a liquid crystal oriented film.

The above object of the present invention can be achieved by a polyamide acid solution comprising a polyamide acid comprising as main components at least one of recurring units represented by formulae (I), (II), (III) and (IV) shown below and a recurring unit represented by formula (V) shown below, dissolved in an organic solvent comprising as a main component an amide type polar solvent having a boiling point of 170° C. or less, such as N,N-dimethylacetamide.

Formula (I) is represented by

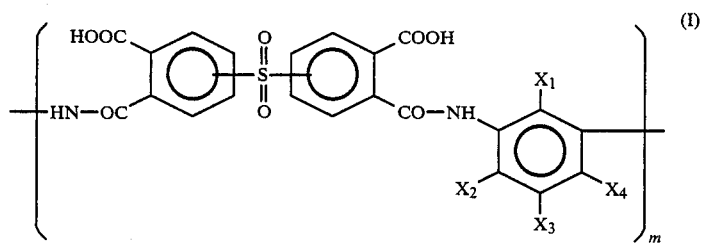
(I)

wherein $X_1$, $X_2$, $X_3$ and $X_4$ (which may be the same or different) each represents H, $CH_3$, $C_2H_5$, $NO_2$, F, COOH or Cl; and m is a positive integer.

Formula (II) is represented by

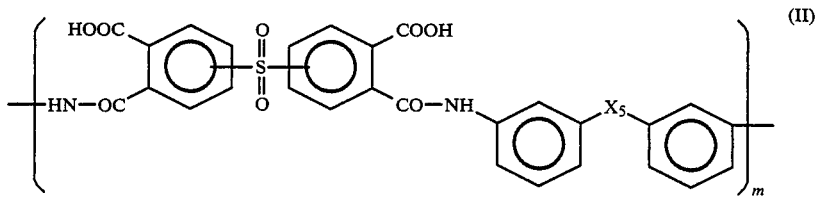
(II)

wherein m is the same as defined above; and $X_5$ represents O, $SO_2$, $CH_2$, S or CO.

Formula (III) is represented by

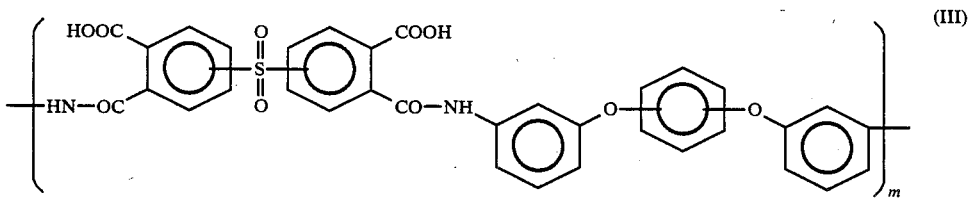
(III)

wherein m is the same as defined above.

Formula (IV) is represented by

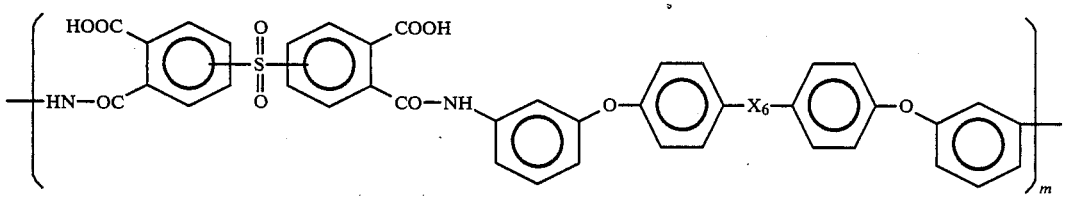
(IV)

wherein m is the same as defined above; and $X_6$ represents $SO_2$, $C(CH_3)_2$ or $C(CF_3)_2$.

Formula (V) is represented by

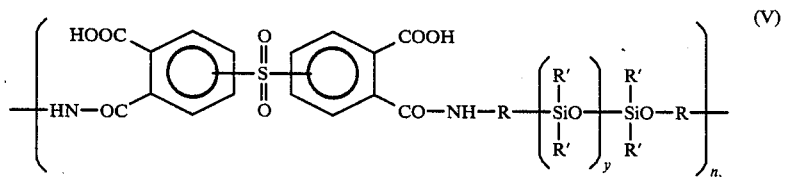
(V)

wherein R represents a divalent hydrocarbon group; R' represents a monovalent hydrocarbon group; y represents an integer of from 1 to 4; and n represents a positive integer selected such that n/(m+n) ranges from 0.01 to 0.05.

DETAILED DESCRIPTION OF THE INVENTION

The term "as a main component" as used herein with respect to both the polyamide acid and the solvent means to include the case where the polyamide acid or the solvent consists solely of at least one of the recurring units described above or at least one of the above-described amide type polar solvents, respectively.

The polyamide acid which can be used in the present invention can be obtained by reacting 3,3',4,4'-diphenylsulfonetetracarboxylic acid dianhydride represented by formula (VI) shown below or a derivative thereof, at least one of m-substituted diamino compounds represented by formulae (VII), (VIII), (IX) and (X) shown below, and a diaminosiloxane represented by formula (XI) shown below.

Formulae (VI) to (XI) are as follows.

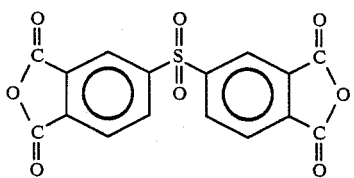 (VI)

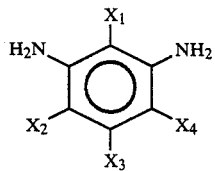 (VII)

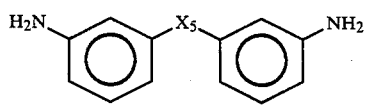 (VIII)

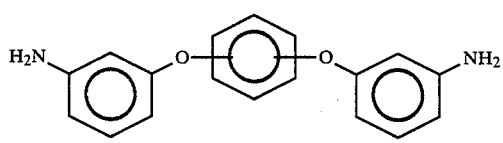 (IX)

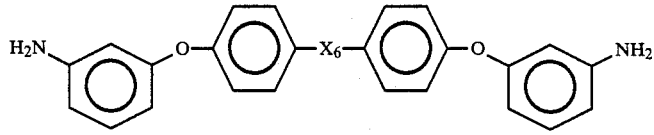 (X)

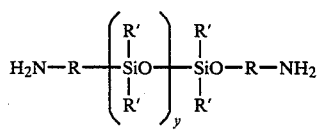 (XI)

wherein $X_1$, $X_2$, $X_3$, $X_4$, $X_5$, $X_6$, R, R′, and y are the same as defined above.

Typical examples of the diamino compounds having amino groups at m-position thereof as represented by formulae (VII) to (X) above are shown below.

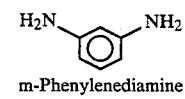
m-Phenylenediamine

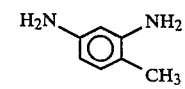
2,4-Tolylenediamine

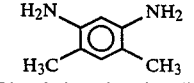
4,6-Dimethyl-m-phenylenediamine

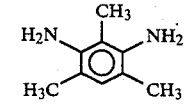
2,4-Diaminomesitylene

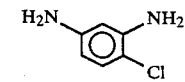

-continued
4-Chloro-m-phenylenediamine

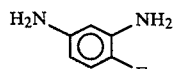
4-Fluoro-m-phenylenediamine

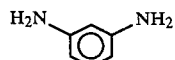
3,5-Diaminobenzoic acid

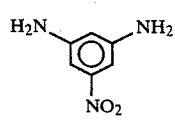
5-Nitro-m-phenylenediamine

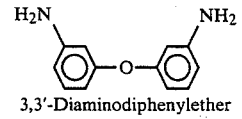
3,3′-Diaminodiphenylether

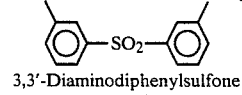
3,3′-Diaminodiphenylsulfone

-continued

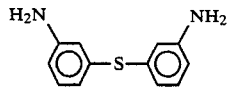
3,3'-Diaminodiphenyl thioether

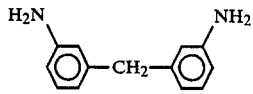
3,3'-Diaminodiphenylmethane

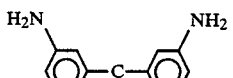
3,3'-Diaminobenzophenone

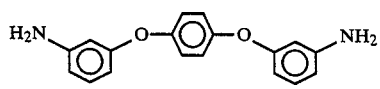
1,4-Bis(3-aminophenoxy)benzene

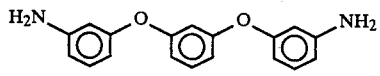
1,3-Bis(3-aminophenoxy)benzene

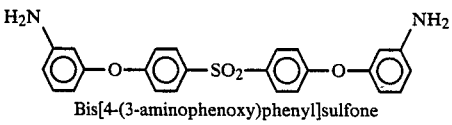
Bis[4-(3-aminophenoxy)phenyl]sulfone

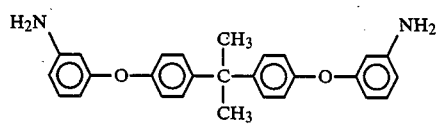
2,2-Bis[4-(3-aminophenoxy)phenyl]propane

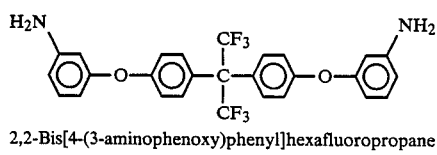
2,2-Bis[4-(3-aminophenoxy)phenyl]hexafluoropropane

These aromatic diamino compounds having amino groups at m-position can be used either individually or in appropriate combinations thereof.

Specific examples of the diaminosiloxane represented by formula (XI) are shown below.

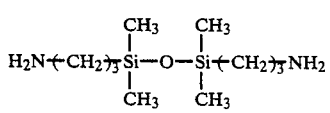

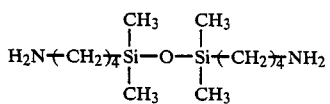

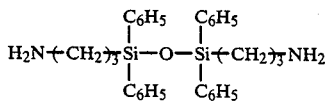

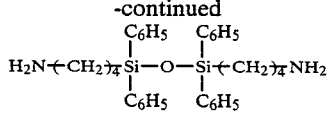

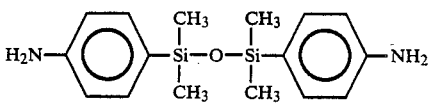

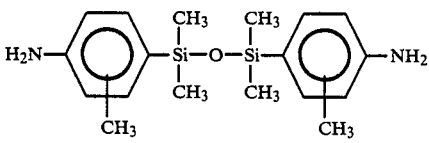

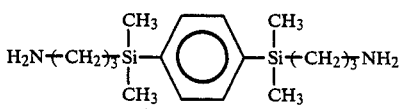

By using the diaminosiloxane of formula (XI), the resulting polyamide acid contains in its molecular skeleton a siloxane bond derived from the diaminosiloxane and is thereby capable of forming a polyimide film having good adhesion to a substrate, e.g., a glass plate. It should be noted, however, that since introduction of an excess siloxane bond adversely affects heat resistance and moisture resistance of the polyimide film, the amount of the diaminosiloxane of formula (XI) used should be controlled such that the proportion of the recurring unit of formula (V) ranges from 1 to 5 mol % based on the total mole number of the recurring units of formulae (I), (II), (III), (IV), and (V). That is, where the recurring number of recurring units in formulae (I) to (IV) is m and the recurring number of recurring unit in formula (V) is n, the amount of the diaminosiloxane is controlled such that $n/(m+n)$ ranges from 0.01 to 0.05.

Improvement in adhesion to a substrate can also be achieved by addition of an epoxy resin, etc. In this case also, addition of too large amount of the epoxy resin impairs characteristics of the resulting polyimide film. Therefore, the amount of the epoxy resin, etc., used should not exceed 10 parts by weight per 100 parts by weight of the polyimide.

The epoxy resins which can be used include bisphenol epoxy resins, novolak epoxy resins, N-glycidylamine epoxy resins, alicyclic epoxy resins, and the like. Of these, triglycidyl diisocyanurate belonging to N-glycidylamine epoxy resins brings about good results.

The above-described aromatic tetracarboxylic acid dianhydrides which can be reacted with the diamino compound are 3,3',4,4'-diphenylsulfonetetracarboxylic acid anhydride or derivatives thereof, and can be used either individually or in combinations of two or more thereof. Use of the dianhydride is preferred. If desired, the 3,3',4,4'-diphenylsulfonetetracarboxylic acid dianhydride or derivative thereof can be partly replaced with other aromatic tetracarboxylic acid dianhydrides than the above-described aromatic tetracarboxylic acid dianhydrides. Use of the other aromatic tetracarboxylic acid dianhydrides in excess adversely affects transparency or adhesion of the polyimide film. Therefore, the amount of the other aromatic tetracarboxylic acid dianhydrides used should be limited to 30 mol % or less per mole of 3,3',4,4'-diphenylsulfonetetracarboxylic acid dianhydride and/or derivatives thereof.

Examples of the other aromatic tetracarboxylic acid dianhydrides which can be used in combination include pyromellitic acid dianhydride, 3,3',4,4'-benzophenonetetracarboxylic acid dianhydride, 4,4'-oxydiphthalic dianhydride, 2,2'-bis(3,4-dicarboxyphenyl)hexafluoropropane dianhydride, 2,3,6,7-naphthalenetetracarboxylic acid dianhydride, 1,2,5,6-naphthalenetetracarboxylic acid dianhydride, 1,4,5,8-naphthalenetetracarboxylic acid dianhydride, 3,3',4,4'-biphenyltetracarboxylic acid dianhydride and derivatives thereof. These tetracarboxylic acid anhydrides may be used either individually or in combinations thereof.

The aromatic diamino compound represented by formulae (VII) to (X) may be partly replaced with other diamino compounds. Since use of such other diamino compounds in excess adversely affects characteristics of the polyimide oriented film, the amount thereof should be limited to 30 mol % or less per mole of the diamino compounds of formulae (VII) to (X). Because such other diamino compound than the compounds of formulae (VII) to (X) is used as a part of the diamino compound of formulae (IV) to (X), the recurring unit formed by the reaction thereof with 3,3',4,4'-diphenylsulfonetetracarboxylic acid dianhydrides is considered to be included in the recurring unit represented by formula (I), and is therefore included in the recurring number m.

Specific examples of the other diamino compounds which can be used in combination include 4,4'-diaminodiphenylether, 3,4'-diaminodiphenylether, 4,4'-diaminodiphenylsulfone, 4,4'-diaminodiphenylmethane, 4,4'-diaminobenzophenone, 4,4'-diaminodiphenylpropane, p-phenylenediamine, benzidine, 3,3'-dimethylbenzidine, 4,4'-diaminodiphenyl thioether, 3,3'-dimethoxy-4,4'-diaminodiphenylmethane, 3,3'-dimethyl-4,4'-diaminodiphenylmethane, bis[4-(4-aminophenoxy)phenyl]sulfone, 2,2-bis(4-aminophenyl)propane, 2,2-bis[4-(4-aminophenoxy)phenyl]hexafluoropropane, etc. These diamino compounds may be used individually or in combinations thereof.

The polyamide acid solution according to the present invention can be obtained by reacting the above-described aromatic tetracarboxylic acid dianhydrides, aromatic diamino compounds, diaminosiloxane, etc., in a low-boiling organic solvent (polymerization solvent). The reaction is preferably carried out at a temperature of 80° C. or lower.

The low-boiling organic solvent used comprises as a main component an amide type polar solvent having a boiling point of 170° C. or less, such as N,N-dimethylacetamide, N,N-dimethylformamide, and the like. The organic solvent used can consist of only the amide type polar solvent having a boiling point of 170° C. or less or may further comprise as a minor component a poor solvent, such as benzene, toluene, hexane, etc., in place of a part of the amide type polar solvent. Such a poor solvent, e.g., benzene, has a low boiling point, and, therefore, may be used in a relatively large proportion. However, if its amount exceeds 50% by weight based on the total weight of the solvents used, adverse influences on characteristics of the polyimide film result. Accordingly, the amount of the other solvent used should be limited not to exceed 50% by weight, and preferably not to exceed 30% by weight, based on the total weight of the solvents used.

The greatest feature of the polyamide acid solution according to the present invention is that the above-described specific polyamide acid is dissolved in the low-boiling organic solvent mainly comprising the amide type polar solvent. When the polyamide acid is heated for dehydrocyclization to form a polyimide, the low-boiling organic solvent volatilizes before it is decomposed, thus eliminating the disadvantage as encountered with the conventional organic polar solvents, such as N-methyl-2-pyrrolidone, that the solvent used partly decomposes to produce blackish brown decomposition products, which cause coloration of the resulting polyimide film. As a result, a colorless transparent polyimide film can be formed.

Thus, the polyamide acid solution of the present invention has the characteristic to use an organic solvent mainly comprising the amide type polar solvent, and the above-described disadvantage associated with N-methyl-2-pyrrolidone, when used as a polymerization solvent, can be removed if it is replaced, after synthesis of the polyamide acid, with an organic solvent mainly comprising the above-described amide type polar solvent in which the produced polyamide acid is dissolved. In this case, the organic solvent mainly comprising the amide type polar solvent serves as a diluting solvent. Thus, the polyamide acid solution of the present invention can be prepared by using a polymerization solvent and a diluting solvent which are different from each other and then dissolving the polyamide acid produced in the different diluting solvent by solvent replacement.

The polyamide acid thus prepared preferably has an inherent viscosity in the range of from 0.3 to 5.0, and more preferably from 0.4 to 2.0, as measured in N,N-dimethylacetamide at a concentration of 0.5 g/100 ml at 30° C. If the inherent viscosity of the polyamide acid is too low, the mechanical strength of the resulting polyimide film becomes undesirably low. On the other hand, if it is too high, it is difficult to cast the polyamide acid solution in film formation. From the standpoint of workability and the like, the polyamide acid solution preferably has a concentration of from 5 to 30% by weight, and more preferably from 15 to 25% by weight.

The inherent viscosity is calculated in accordance with equation:

$$\text{Inherent Viscosity} = \frac{\text{Natural Logarithm} \left(\frac{\text{Viscosity of Solution}}{\text{Viscosity of Solvent}}\right)}{\text{Concentration of Polymer in Solution}}$$

The viscosity in the equation is measured by a capillary viscometer.

In the formation of a polyimide oriented film from the polyamide acid solution according to the present invention, the polyamide acid solution is directly applied to a surface of a glass plate on which a transparent electrode is formed by conventional technique, such as brush coating, dip coating, rotational coating, printing, and the like. If desired, the polyamide acid solution coated can be diluted appropriately with the organic solvent mainly comprising the above-described amide type polar solvent. The coating is then heat treated at 150° C. for 60 minutes, at 200° C. for 60 minutes, and finally at 250° C. for several hours to dehydrocyclize the polyamide acid to obtain a polyimide oriented film.

In cases where the polyamide acid solution is used for the production of solar cell substrates or film formation on lenses, the same procedure as described above can be applied.

The thus prepared polyimide oriented film is of very high quality having colorless transparency free from coloration due to decomposition product of organic polar solvents, such as N-methyl-2-pyrrolidone. Moreover, the polyimide oriented film exhibits strong adhesion to the substrate.

As described above, the polyamide acid solution in accordance with the present invention is constructed such that the specific polyamide acid is dissolved in an organic solvent mainly comprising the amide type polar solvent having a boiling point of 170° C. or less, and is therefore capable of forming a polyimide oriented film which has colorless transparency and strong adhesion to a substrate enough to prevent penetration of water into the interface between the substrate and the film.

The present invention will now be illustrated in greater detail by reference to the following Examples and Comparative Example, but it should be understood that the present invention is not limited thereto.

EXAMPLE 1

In a separable four-necked flask equipped with a thermometer, a stirrer, a tube for introducing nitrogen gas, and a Liebig condenser were charged 0.1 mol of 3,3',4,4'-diphenylsulfonetetracarboxylic acid dianhydride, 0.096 mol of m-phenylenediamine, and 0.004 mol of 1,3-bis(aminopropyl)tetramethyldisiloxane, and N,N-dimethylacetamide was added thereto so as to result in a concentration of 20% by weight. The mixture was allowed to react for 8 hours with stirring while controlling the temperature not to exceed 50° C. to obtain a viscous polyamide acid solution.

After diluting the solution with N,N-dimethylacetamide, the solution was uniformly coated with a spinner on a glass plate on which a transparent electrode composed of indium-tin oxide had been formed. The coated solution was then heated at 150° C., at 200° C., and finally at 250° C. each for 1 hour to prepare a substrate for liquid crystal cell having a polyimide film of about 1000Å in thickness.

When the surface of the resulting polyimide film on the substrate was rubbed with gauze in a given direction, the polyimide film did not peel off. Further, the resulting polyimide film showed colorless transparency free from coloration.

Two substrates having been subjected to rubbing treatment obtained above were superposed upon each other with a spacer being sandwiched therebetween, and the space in the peripheral portion of the structure was filled with an epoxy resin, which was then cured at 120° C. for 1 hour for sealing, to obtain an element. A liquid crystal was then injected into the inside space of the element thus obtained, and the opening for injection was sealed with an epoxy resin to produce a liquid crystal cell.

The resulting liquid crystal cell had a transmittance of 87% at 400 nm and a leakage current of $81 \times 10^{-9}$ A and exhibited satisfactory orientation characteristics. When the liquid crystal cell was subjected to pressure cooker test at 121° C. and under a steam pressure of 2 atm. for 48 hours, no failure, such as blurring, was observed, and the leakage current was substantially equal to the initial value.

EXAMPLE 2

A polyamide acid solution was prepared in the same manner as in Example 1, except for replacing the m-phenylenediamine as used in Example 1 with the same molar amount of 3,3'-diaminodiphenylsulfone. A liquid crystal cell was produced using the resulting polyamide acid solution in the same manner as in Example 1.

The resulting liquid crystal cell had a transmittance of 90% at 400 nm and a leakage current of $80 \times 10^{-9}$ A, and exhibited satisfactory orientation characteristics. When the liquid crystal cell was subjected to pressure cooker test under the same conditions as in Example 1, no failure, such as blurring, was observed and the leakage current was substantially equal to the initial value.

EXAMPLE 3

A polyamide acid solution was prepared in the same manner as in Example 1, except for replacing the m-phenylenediamine as used in Example 1 with 1,3-bis(3-aminophenoxy)benzene. A liquid crystal cell was produced using the resulting polyamide acid solution in the same manner as in Example 1.

The liquid crystal cell had a transmittance of 89% at 400 nm and a leakage current of $87 \times 10^{-9}$ A and exhibited satisfactory orientation characteristics. When the liquid crystal cell was subjected to pressure cooker test under the same conditions as in Example 1, no failure, such as blurring, was observed, and the leakage current was substantially equal to the initial value.

EXAMPLE 4

A polyamide acid solution was prepared in the same manner as in Example 1, except for replacing the m-phenylenediamine as used in Example 1 with 2,2-bis(3-aminophenoxyphenyl)sulfone. A liquid crystal cell was produced using the resulting polyamide acid solution in the same manner as in Example 1.

The resulting liquid crystal cell had a transmittance of 90% at 400 nm and a leakage current of $85 \times 10^{-9}$ A and exhibited satisfactory orientation characteristics. When the liquid crystal cell was subjected to pressure cooker test in the same manner as in Example 1, no failure, such as blurring, was observed, and the leakage current was substantially equal to the initial value.

EXAMPLE 5

A polyamide acid solution was prepared in the same manner as in Example 2, except for replacing the N,N-dimethylacetamide as used in Example 2 with N,N-dimethylformamide. A liquid crystal cell was produced using the resulting polyamide acid solution in the same manner as in Example 1.

The liquid crystal cell had a transmittance of 89% at 400 nm and a leakage current of $82 \times 10^{-9}$ A and exhibited satisfactory orientation characteristics. When the liquid crystal cell was subjected to pressure cooker test in the same manner as in Example 1, no failure, such as blurring, was observed, and the leakage current was only slightly lower than the initial value.

EXAMPLE 6

A polyamide acid solution was prepared in the same manner as in Example 4, except for replacing the N,N-dimethylacetamide as used in Example 4 with N,N-dimethylformamide. A liquid crystal cell was produced using the resulting polyamide acid solution in the same manner as in Example 1.

The liquid crystal cell had a transmittance of 88% at 400 nm and a leakage current of $84 \times 10^{-9}$ A, and exhibited satisfactory orientation characteristics. When the liquid crystal cell was subjected to pressure cooker test in the same manner as in Example 1, no failure, such as blurring, was observed, and the leakage current was only slightly lower than the initial value.

COMPARATIVE EXAMPLE

A polyamide acid solution was prepared in the same manner as in Example 1, except for using N-methyl-2-pyrrolidone in place of the N,N-dimethylacetamide, 0.1 mol of 3,3',4,4'-diphenylsulfonetetracarboxylic acid dianhydride, and 0.1 mol of 4,4'-diaminodiphenylether. A liquid crystal cell was produced using the resulting polyamide acid solution in the same manner as in Example 1.

The display part of the cell was slightly colored in yellowish brown. When it was subjected to pressure cooker test in the same manner as in Example 1, blurring was observed in the display part, and the leakage current was one-third or less of the initial value.

While the invention has been described in detail and with reference to specific embodiments thereof, it will be apparent to one skilled in the art that various changes and modifications can be made therein without departing from the spirit and scope thereof.

What is claimed is:

1. A polyamide acid solution comprising a polyamide acid comprising as main components at least one recurring unit selected from the group consisting of a recurring unit represented by formula (I)

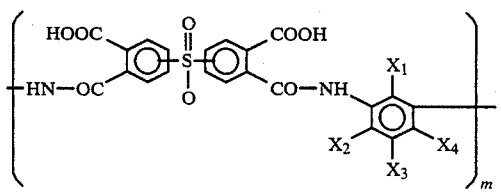

wherein $X_1$, $X_2$, $X_3$ and $X_4$, which may be the same or different, each represents H, $CH_3$, $C_2H_5$, $NO_2$, F, COOH or Cl; and m represents a positive integer; a recurring unit represented by formula (II)

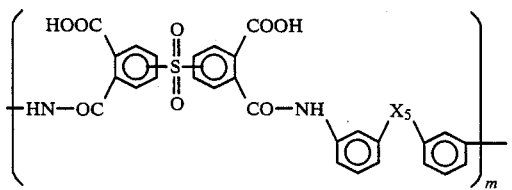

wherein $X_5$ represents O, $SO_2$, $CH_2$, S or CO; and m is the same as defined above; a recurring unit represented by formula (III)

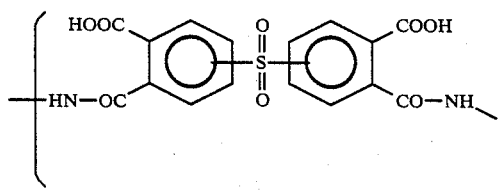

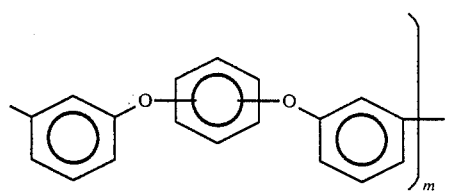

wherein m is the same as defined above; and a recurring unit represented by formula (IV)

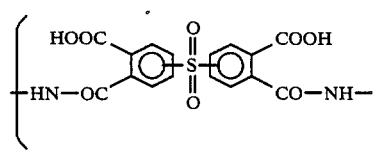

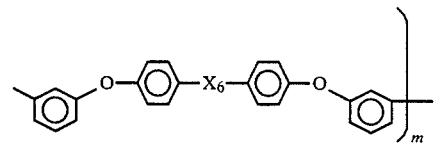

wherein $X_6$ represents $SO_2$, $C(CH_3)_2$ or $C(CF_3)_2$; and m is the same as defined above, and a recurring unit represented by formula (V)

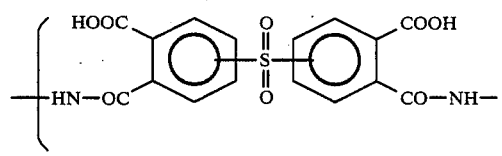

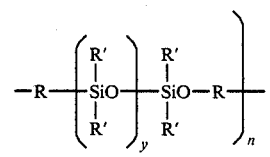

wherein R represents a divalent hydrocarbon group; R' represents a monovalent hydrocarbon group; y represents an integer of from 1 to 4; and n represents a positive integer selected so that $n/(m+n)$ ranges from 0.01 to 0.05, dissolved in an organic solvent comprising as a main component an amide type polar solvent having a boiling point of 170° C. or less.

2. A polyamide acid solution as in claim 1, wherein said solution further comprises 10 parts by weight or less of an epoxy resin per 100 parts by weight of the polyamide acid.

3. A polyamide acid solution as in claim 2, wherein said epoxy resin is triglycidyl isocyanurate.

4. A polyamide acid solution as in claim 1, wherein said amide type polar solvent is N,N-dimethylacetamide or N,N-dimethylformamide.

5. A polyamide acid solution as in claim 1, wherein said amide type polar solvent is present in an amount of at least 50% by weight based on the total weight of the whole solvents used.

6. A polyamide acid solution as in claim 5, wherein said amide type polar solvent is present in an amount of at least 70% by weight based on the total weight of the whole solvents used.

7. A polyamide acid solution as in claim 1, wherein said solution has an inherent viscosity ranging from 0.3 to 5.0.

8. A polyamide acid solution as in claim 7, wherein said solution has an inherent viscosity ranging from 0.4 to 2.0.

9. A polyamide acid solution as in claim 1, wherein said solution has a concentration of from 5 to 30% by weight.

10. A polyamide acid solution as in claim 9, wherein said solution has a concentration of from 15 to 25% by weight.

* * * * *